Patented Oct. 28, 1941

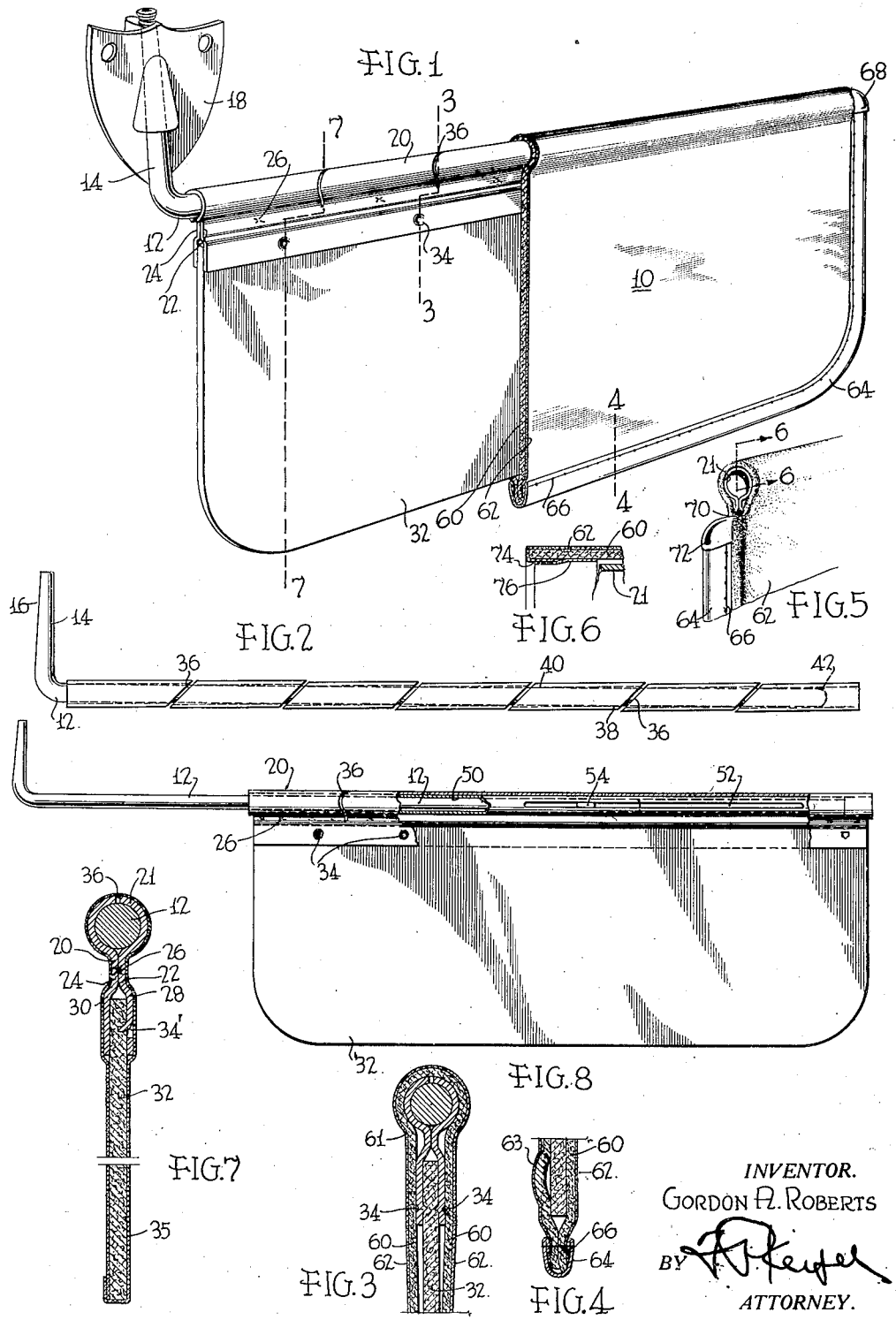

2,260,482

UNITED STATES PATENT OFFICE 2,260,482

VISOR

Gordon A. Roberts, Grosse Pointe, Mich.

Application June 17, 1938, Serial No. 214,213

5 Claims. (Cl. 296—97)

This invention relates to visors and, more particularly, to visors adapted for automobile vehicle use.

In such vehicles, it is common practice to provide a visor or anti-glare shield adjustably supported adjacent the windshield so that the driver of the vehicle may adjust the shield to varying positions to cut off the glare of sunlight, reflected headlights of other vehicles, and other causes of glare which may originate more or less off the line of his necessary vision for driving the vehicle. Such visors are manually adjustable and are necessarily provided with some friction arrangement for maintaining their adjusted position, unless forcibly moved to some newly selected position.

It is an object of the present invention to provide a visor having an improved friction adjustment which is exceptionally cheap to manufacture, durable in construction, and which will maintain a proper degree of friction throughout long use.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the similar views, Figure 1 is a view of the visor with its support rod with a portion of the covering material cut away to expose the construction in detail;

Figure 2 is a top view of the hinged portion of Figure 1 with the covering removed;

Figure 3 is a transverse enlarged section taken through Figure 1 on the line 3—3;

Figure 4 is a transverse enlarged section taken through Figure 1 on the line 4—4;

Figure 5 is a fragmentary left end view of the visor;

Figure 6 is a fragmentary section of Figure 5 taken on the plane 6—6;

Figure 7 is a section taken on the line 7—7 of Figure 1 and illustrating certain details and modifications thereof; and Figure 8 is a modified form of the invention.

Referring to Figure 1, there will be seen a visor generally indicated as at 10, mounted on a support rod 12 having an angular end 14 slightly tapered as at 16 for insertion into a swivel support bracket 18, the tapering providing a tight friction bearing therein.

The visor 10, which is swivelly mounted on rod 12, is formed of a metallic strip 20, longitudinally bent around the rod 12 to form a tubular portion 21 in a manner to provide radially extending flanges 22 and 24 which, in the construction shown, are spot welded together at a plurality of points 26 closely adjacent the tubular portion 21. The flanges, after being secured together, as described, are thereafter offset as at 28 and 30 a small amount to provide a spacing therebetween and a sheet of fibrous or other suitable stiff material 32 is inserted between the flanges so as to abut the offsets 30 and 28 and is preferably secured therein by striking a plurality of inturned integral fingers 34', as shown in Figure 7, from either flange 22 or 24 so as to embed in the fibrous material 32, or by striking pinch points 34, as shown in Figure 3. The fibrous material 32 may be cut to any desired shape to form a suitable visor and may thereafter be covered by suitable finishing material, roughly, as indicated at 35, in Figure 7, or as otherwise described hereinafter in a more detailed and ornamental fashion.

In order to provide a friction grip between the tubular portion 21 and the rod 12, so that the visor may be placed in any desired position and frictionally there held, the tube 21 is cut diagonally in a plurality of spaced places, as indicated at 36, and the tubular portions formed thereby, are given a slight offset with respect to one another prior to the insertion of the support rod 12. As illustrated in a somewhat exaggerated fashion in Figure 2, each of the tube sections formed between the cuts 36 is slightly misaligned with the adjacent section and, for example, the portions 38 and 40 of each section will be seen to bear against a rod 12 in a friction gripping fashion. In practice, should the diameter of the rod 12 vary slightly or the diameter of the tube vary due to manufacturing difficulties, the friction grip can always be adjusted by increasing or decreasing the amount of offset. Also after long periods of wear, if the friction grip becomes relaxed and too loose, the visor may be removed from the rod and a slight new offset may be given to the tubular sections. In order to facilitate the assembly of the parts, it will appear preferable to have the end of the rod 12 slightly rounded as shown at 42 so that the rod 12 may thread its way into the tubular portion 21.

In Figure 8 a modified construction is shown wherein a sleeve 50 is interposed between the tubular portion 21 and the rod 12. The sleeve is provided with a slot 52 engaging a key 54 secured near the end of the rod 12. The sleeve extends substantially the length of the tubular portion 21 and, depending upon the length of the slot 52, provides an additional sliding adjustment lengthwise of the rod 12 as well as providing the friction swivel of the modification of Figure 1.

While any suitable covering may be applied, as suggested in Figure 7, a neat finished article may be formed by covering the visor 32 and tube 20, with a fold of fibrous material 60 covered with cloth 62, the same being folded around the tubular portion 21 of the metallic strip 20, and secured around the edges of the visor 32 by a binding 64 stitched thereto, as indicated at 66. An ornamental metallic cap 68 may be pinched over the end of the binding and thereby trim off the corner of covering material which would otherwise be exposed, and at the same time close the end of the tube 21. The fibrous material 60 is sufficiently stiff to hold its shape where bent as at 61, and may be impressed with ornamental ridges 63 extending along the border, if desired, or for other purposes, as impressing a trademark on the visor surface.

As shown in Figures 5 and 6, the tube 21 must be left open for insertion of the rod 12 at one end of the visor. The covering material 60 and 62 is therefore cut at 70 and the heavy material 60 removed around the tube portion 21 to a point substantially flush with the end thereof. An ornamental metallic cap 72 is pinched over the end of the binding 64 and covering material 60 and 62, and, as shown in Figure 6, the cloth covering 62 adjacent the tubular portion 21, is turned in around the fibrous material 60 as shown at 74, and an adhesive binding layer 76 applied to secure the inturned portion 74 in place.

There is thus provided a visor construction comprising a single hinge piece so constituted as to afford friction grip without necessitating any substantial addition thereto and has, as has been pointed out, the friction grip readily adjustable to accommodate slight variations of rod diameter and may be fabricated with a minimum of operation and expense. For example, the metallic structure may be formed continuously in long strips and cut to the proper length and thereafter slotted through the tubular portion. Also the welds may be effected at any stage of the fabrication.

Although only one embodiment of the invention and a modification thereof have been illustrated and described, it is to be understood that the invention is not limited thereto but may be embodied in various mechanical forms and arrangements, for example, the various fastening means may be changed to equivalents thereof, such as rivets. As various changes in construction and form may be made without departing from the spirit of the invention, as is apparent to those skilled in the art, reference may be had to the appended claims for a definition of the limits of the invention.

What is claimed is:

1. A visor comprising a support rod, a tubular sleeve slidable thereon and means for limiting its sliding motion, a strip of metal bent longitudinally around said rod sleeve to form a tube therefor with radially extending flanges, said tube being cut into a plurality of sections and each section being bent slightly out of line with each other, means securing said flanges together, and a shield secured to said flanges.

2. In a friction hinge for a visor, a supporting rod, a sleeve slidable thereon and means for limiting its sliding motion, a strip of metal bent longitudinally to form a tubular portion and a pair of adjacent radial flanges, said flanges being secured together adjacent the tubular portion, and said tubular portion being cut obliquely into a plurality of sections, said sections being twisted askew of the hinge axis slightly out of axial alignment with one another to frictionally grip said sleeve.

3. A visor comprising a support rod, a sleeve slidable thereon, means for limiting the relative sliding movement between said sleeve and rod and means for preventing relative rotation therebetween, a strip of metal bent longitudinally around said sleeve to form a tube with radially extending flanges, said tube being cut into a plurality of sections and each section being slightly bent out of alignment, means securing said flanges together and a shield secured to said flanges, said section being bent sufficiently to frictionally grip said sleeve.

4. A visor comprising a flat supporting means having a tube along one edge, covering material comprising an inner relatively stiff layer and a soft external layer folded around said tube and extending slightly beyond said supporting means, a binding stitched around the edges of said covering beyond said supporting means, said binding extending up to the fold on one side to close said tube, and short of said fold on the other side to expose said tube, ornamental means for covering the ends of said binding and said covering adjacent said binding ends, and said soft external layer of covering material being folded within the portion folded around the tube to cover the inner stiff layer.

5. In a friction hinge for a visor, a strip of metal bent longitudinally to form a tubular portion and a pair of adjacent radial flanges, said flanges being secured together adjacent the tubular portion, said tubular portion being cut diagonally into a plurality of sections, and said sections being bent askew of their common axis to resiliently frictionally grip a rod extending through said tubular portion, each section having its opposite end portion offset on opposite sides of said common axis.

GORDON A. ROBERTS.